US009756200B2

(12) United States Patent
Nanbu et al.

(10) Patent No.: US 9,756,200 B2
(45) Date of Patent: Sep. 5, 2017

(54) IMAGE PROCESSING APPARATUS WITH AN IMPROVED TABLE IMAGE DETECTING UNIT

(71) Applicant: KYOCERA Document Solutions Inc.

(72) Inventors: Sota Nanbu, Osaka (JP); Hiroyuki Harada, Osaka (JP)

(73) Assignee: Kyocera Document Solutions, Inc. (JP)

( * ) Notice: Subject to any disclaimer, the term of this patent is extended or adjusted under 35 U.S.C. 154(b) by 3 days.

(21) Appl. No.: 14/925,779

(22) Filed: Oct. 28, 2015

(65) Prior Publication Data
US 2016/0134768 A1    May 12, 2016

(30) Foreign Application Priority Data

Nov. 6, 2014   (JP) ................. 2014-225787

(51) Int. Cl.
| | |
|---|---|
| H04N 1/00 | (2006.01) |
| H04N 1/40 | (2006.01) |
| H04N 1/60 | (2006.01) |
| H04N 1/411 | (2006.01) |
| H04N 1/64 | (2006.01) |
| G06K 9/00 | (2006.01) |
| H04N 1/405 | (2006.01) |

(52) U.S. Cl.
CPC ...... *H04N 1/00376* (2013.01); *G06K 9/00456* (2013.01); *H04N 1/0036* (2013.01); *H04N 1/405* (2013.01); *H04N 1/40062* (2013.01); *H04N 1/4115* (2013.01); *H04N 1/6072* (2013.01); *H04N 1/642* (2013.01); *H04N 2201/0094* (2013.01)

(58) Field of Classification Search
CPC ............ H04N 1/00376; H04N 1/0036; G06K 9/00456; G06K 9/00463
See application file for complete search history.

(56) References Cited

U.S. PATENT DOCUMENTS

2002/0106124 A1    8/2002  Wang

FOREIGN PATENT DOCUMENTS

JP    2000-200350    7/2000

Primary Examiner — Christopher D Wait

(57) ABSTRACT

An image processing apparatus includes an area extracting unit and a table image detecting unit. The area extracting unit is configured to extract halftone dot areas and character images in an image. The table image detecting unit is configured to detect the extracted halftone dot areas as a table image if (a) the extracted halftone dot areas include no ruled lines, (b) plural halftone dot areas among the extracted halftone dot areas are arrayed in a primary scanning direction and/or a secondary scanning direction, and (c) the arrayed plural halftone dot areas include the character images at at least two positions.

5 Claims, 6 Drawing Sheets

FIG. 6

|  | TEST#1 | | TEST#2 | |
|---|---|---|---|---|
|  | BEFORE CHANGE | AFTER CHANGE | BEFORE CHANGE | AFTER CHANGE |
| DOCUMENT A | 29.7 | 27.7 | — | — |
| DOCUMENT B | 64.1 | 55.9 | 54.0 | 54.0 |

IMAGE PROCESSING APPARATUS WITH AN IMPROVED TABLE IMAGE DETECTING UNIT

CROSS-REFERENCE TO RELATED APPLICATIONS

This application relates to and claims priority rights from Japanese Patent Application No. 2014-225787, filed on Nov. 6, 2014, the entire disclosures of which are hereby incorporated by reference herein.

BACKGROUND

1. Field of the Present Disclosure

The present disclosure relates to an image processing apparatus.

2. Description of the Related Art

An image processing apparatus detects a frame and a dashed line, presumes a ruled line on the basis of the detected frame and the detected dashed line, and thereby identifies whether the frame is a table image or not.

Contrarily, a table is sometimes expressed without a ruled line. For example, changing a background color in a table cell by cell, column by column, or row by row enables to express a table without a ruled line. The background in a table expressed in such manner is a solid image and therefore when such a table is printed, the background in the table is printed as halftone dots.

When scanning an image of a printed matter that includes such table using a scanner, such table appears as a halftone dot area in the scanned image. In addition, in the scanned image, a gradation image such as a photograph also appears as a halftone dot area.

In case of a table with a ruled line, a halftone dot area in an image is identified as a table image on the basis of a ruled line using the aforementioned manner. However, in case of a table without a ruled line, it is difficult to correctly identify a halftone dot area in an image as a table image.

SUMMARY

An image processing apparatus according an aspect of the present disclosure includes an area extracting unit and a table image detecting unit. The area extracting unit is configured to extract halftone dot areas and character images in an image. The table image detecting unit is configured to detect the extracted halftone dot areas as a table image if (a) the extracted halftone dot areas include no ruled lines, (b) plural halftone dot areas among the extracted halftone dot areas are arrayed in a primary scanning direction and/or a secondary scanning direction, and (c) the arrayed plural halftone dot areas include the character images at at least two positions.

Further, an image processing apparatus according to an aspect of the present disclosure includes an area extracting unit and a table image detecting unit. The area extracting unit is configured to extract a halftone dot area and a character image in an image. The table image detecting unit is configured to detect the extracted halftone dot area as a table image if (a) the extracted halftone dot area includes no ruled lines and (b) white pixels are continuously arranged with a predetermined length or more in a primary scanning direction and/or a secondary scanning direction in the extracted halftone dot area.

These and other objects, features and advantages of the present disclosure will become more apparent upon reading of the following detailed description along with the accompanied drawings.

BRIEF DESCRIPTION OF THE DRAWINGS

FIG. 6 shows a diagram that indicates an example of a halftone dot area that includes continuously arranged white pixels.

DETAILED DESCRIPTION

Hereinafter, an embodiment according to aspects of the present disclose will be explained with reference to drawings.

Figure 1:
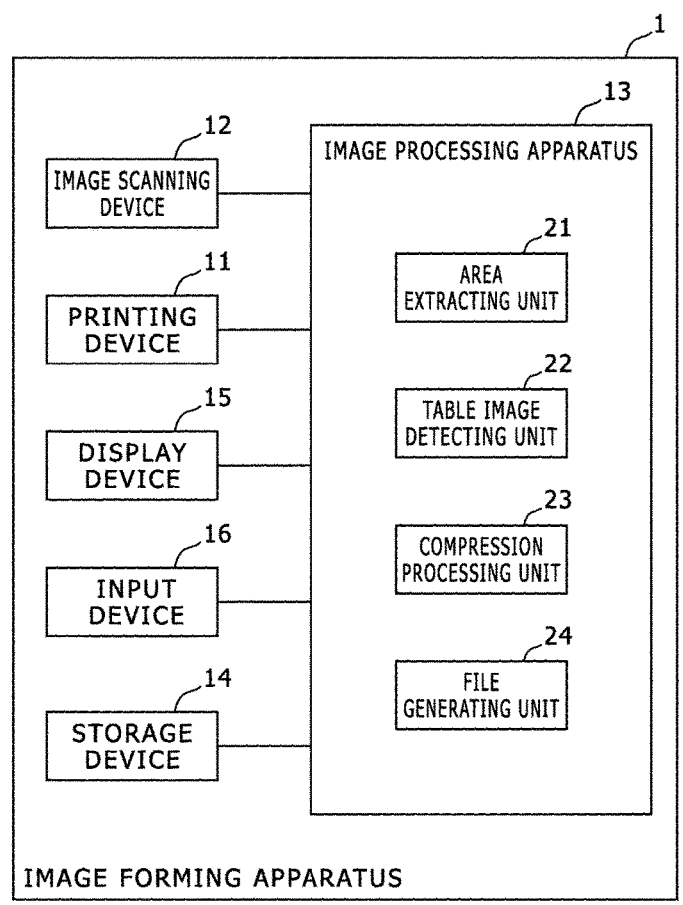
FIG. 1 shows a block diagram that indicates a configuration of an image forming apparatus that includes an image processing apparatus according to an embodiment of the present disclosure.

FIG. 1 shows a block diagram that indicates a configuration of an image forming apparatus that includes an image processing apparatus according to an embodiment of the present disclosure. The image forming apparatus 1 is a multi function peripheral, but may be a scanner, a copier or the like.

The image forming apparatus 1 includes a printing device 11, an image scanning device 12, an image processing apparatus 13, a storage device 14, a display device 15, and an input device 16.

The printing device 11 is an internal device that prints a document image based on image data after sorts of image processing performed by the image processing apparatus in an electrophotographic process using toner of CMYK (Cyan, Magenta, Yellow, and Black) colors.

Further, the image scanning device 12 is an internal device that optically scans a document image of a document and generates image data of the document image as RGB data.

Furthermore, the image processing apparatus 13 performs image processing such as color adjustment, color conversion and so forth for image data such as the image data generated by the image scanning device 12. Furthermore, the storage device 14 is a non volatile rewritable storage device such as a flash memory and stores sorts of data and programs.

The image processing apparatus 13 is embodied with an ASIC (Application Specific Integrated Circuit), a computer or the like, and includes an area extracting unit 21, a table image detecting unit 22, a compression processing unit 23, and a file generating unit 24.

The area extracting unit 21 extracts halftone dots area and a character image in an image based on raster image data.

Regarding a halftone dot area, for example, the area extracting unit 21 detects a cyclic halftone dot pattern, detects an edge of the halftone dot pattern, and extracts the internal area from the edge as a halftone dot area. Regarding a character area, for example, the area extracting unit 21 extracts a character image using a labeling process.

The table image detecting unit 22 determines whether the extracted halftone dot areas include a ruled line or not, and if the halftone dot areas include a ruled line, then the table image detecting unit 22 extracts the halftone dot areas as a table image.

Further, if the halftone dot areas include no ruled lines, then the table image detecting unit 22 detects the extracted halftone dot areas as a table image if plural halftone dot areas among the extracted halftone dot areas are arrayed in a primary scanning direction or a secondary scanning direction and the arrayed plural halftone dot areas include the character images at at least two positions.

It should be noted that if plural character images are continuously arranged with a spatial interval of a predetermined value or less, then it is determined that at one position these character images are located; and if two character images are arranged with a spatial interval more than the predetermined value, then it is determined that at two positions these character images are located.

Further, if the halftone dot areas include no ruled lines, then the table image detecting unit 22 detects the extracted halftone dot area as a table image if white pixels are continuously arranged with a predetermined length or more in a primary scanning direction or a secondary scanning direction in the extracted halftone dot area. Here the predetermined length is a maximum size of the character image that can be extracted by the area extracting unit 21. For example, this predetermined length is set as one inch.

The compression processing unit 23 identifies other parts than the detected table image and the character images as a background image, and independently compresses the detected table image, the character images and the background image in a predetermined coding method. Image data of the background image is multi-bit data.

For example, the compression processing unit 23 independently compresses the detected table image, the character images and the background image in a JPEG (Joint Photographic Experts Group) method. In this process, the compression may be performed in respective different conditions (an image resolution, a coding method used for the compression, or the like) for the table image, the character images and the background image. For example, a loss-less method such as a GIF (Graphics Interchange Format) method or a PNG (Portable Network Graphics) method may be used as a coding method for the compression.

In this embodiment, the compression processing unit 23 converts colors of each cell, each column or each row (for example, a cell, a column or a row having color fluctuation within a predetermined range) in the table image to a single color and compress the table image that has the changed color. Colors of the detected table image are reduced in such manner and thereby an image data size of the compressed table image gets small.

The file generating unit 24 generates an image file (e.g. a PDF (Portable Document Format) file) that includes the compressed table image, the compressed character images and the compressed background image in respective layers.

Figure 2:
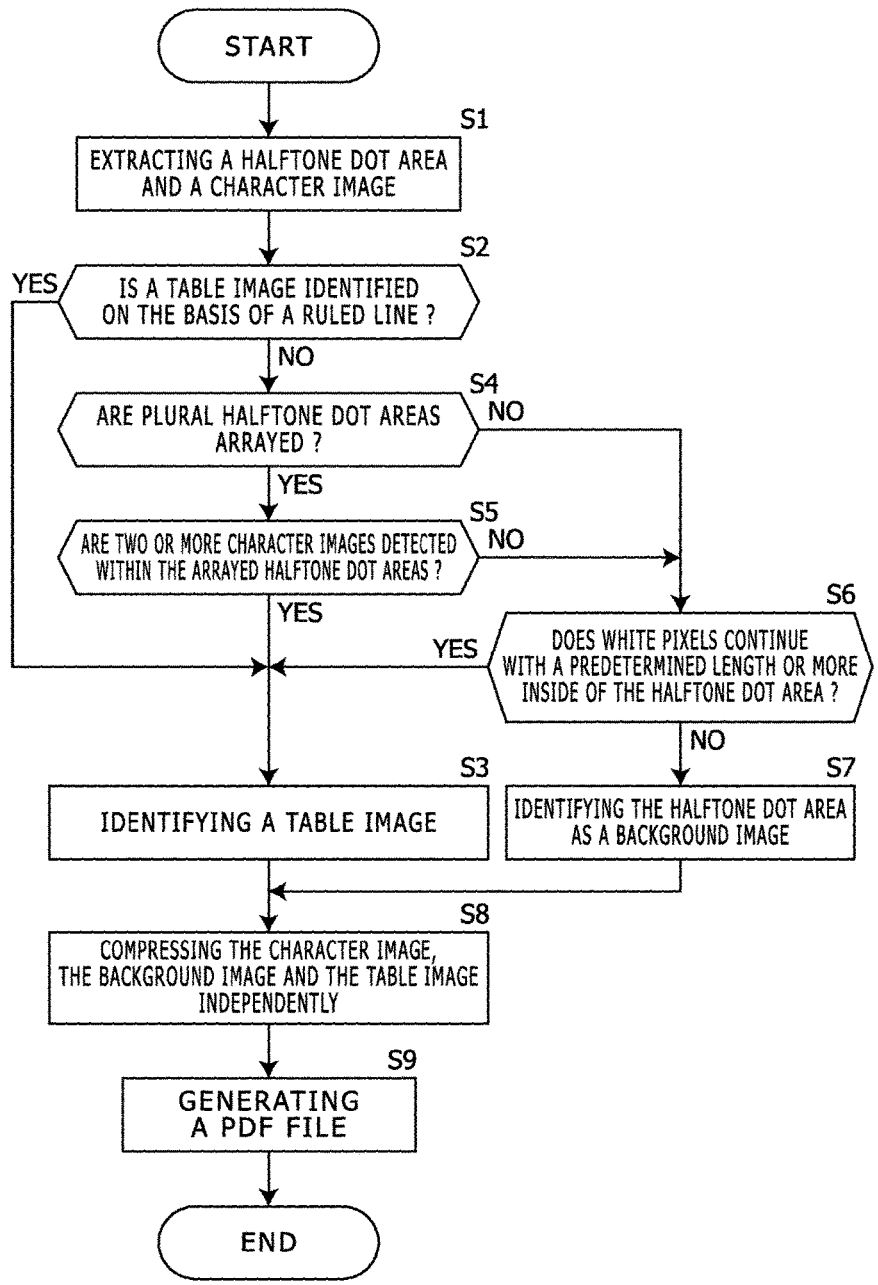
FIG. 2 shows a flowchart that explains a behavior of the image processing apparatus 13 shown in FIG. 1.

The following part explains a behavior of the aforementioned image processing apparatus 13. FIG. 2 shows a flowchart that explains a behavior of the image processing apparatus 13 shown in FIG. 1.

Firstly the area extracting unit 21 extracts one or more halftone dots areas and one or more character images in an image based on raster image data (in Step S1).

Subsequently, the table image detecting unit 22 performs the following process for the halftone dot areas and thereby determines whether the halftone dot areas are a table image or not.

The table image detecting unit 22 determines whether the halftone dot areas include a ruled line or not (in Step S2). If the halftone dot areas include a ruled line, then the table image detecting unit 22 identifies the halftone dot areas as a table image (in Step S3).

Contrarily, if the halftone dot areas include no ruled lines, then for plural halftone dot areas that include an objective halftone dot area selected in turn from the extracted halftone dot areas, the table image detecting unit 22 determines whether or not (a) the plural halftone dot areas are arrayed in a primary scanning direction and/or a secondary scanning direction and (b) the arrayed plural halftone dot areas include the character images at at least two positions (in Steps S4 and S5).

If (a) the plural halftone dot areas are arrayed in the primary scanning direction and/or the secondary scanning direction and (b) the arrayed plural halftone dot areas include the character images at at least two positions, then the table image detecting unit 22 identifies the arrayed plural halftone dot areas as a table image (in Step S3).

Figure 3:
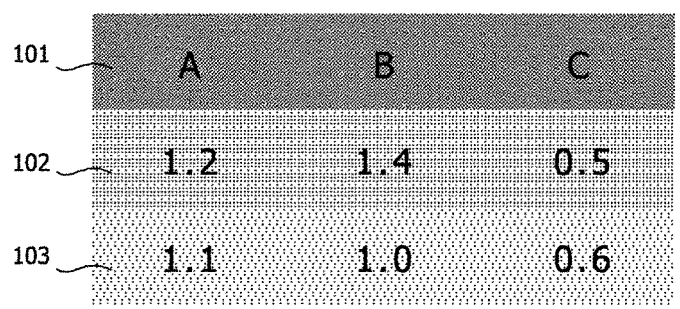
FIG. 3 shows a diagram that indicates an example of arrayed plural halftone dot areas.
Figure 4:
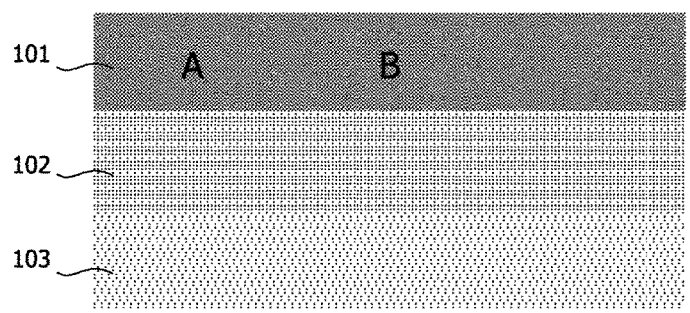
FIG. 4 shows a diagram that indicates another example of arrayed plural halftone dot areas.
Figure 5:
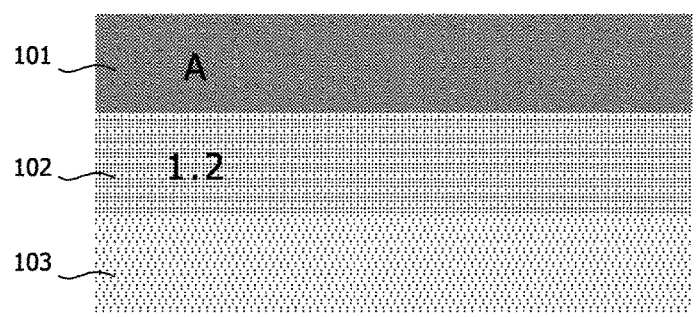
FIG. 5 shows a diagram that indicates further another example of arrayed plural halftone dot areas.

FIG. 3 shows a diagram that indicates an example of arrayed plural halftone dot areas. FIG. 4 shows a diagram that indicates another example of arrayed plural halftone dot areas. FIG. 5 shows a diagram that indicates further another example of arrayed plural halftone dot areas.

In the examples shown in FIGS. 3 to 5, plural halftone dot areas 101 to 103 with the same width in the primary scanning direction are arrayed in the secondary scanning direction. It should be noted that the halftone dot areas 101 to 103 have densities or colors different from each other.

In the example shown in FIG. 3, each one of the halftone dot areas 101 to 103 includes character images at three positions. In the case shown in FIG. 3, the halftone dot areas 101 to 103 are detected as a table image.

Further, in the example shown in FIG. 4, the halftone dot area 101 includes character images at two positions and the halftone dot areas 102 and 103 include no character images. In this case, the halftone dot areas 101 to 103 are also detected as a table image.

Furthermore, in the example shown in FIG. 5, each one of the halftone dot areas 101 and 102 includes character images at one position and the halftone dot area 103 includes no character images. In this case, the halftone dot areas 101 to 103 are also detected as a table image.

On the other hand, if the objective halftone dot area has no adjacent halftone dot areas (i.e. plural halftone dot areas are not arrayed) or plural halftone dot areas are arrayed but do not include character images at at least two positions, then the table image detecting unit 22 determines whether or not white pixels are continuously arranged with a predetermined length or more in the primary scanning direction and/or the secondary scanning direction in the objective halftone dot area (in Step S6).

If white pixels are continuously arranged with a predetermined length or more in the primary scanning direction and/or the secondary scanning direction in the objective halftone dot area, then the table image detecting unit 22 identifies the objective halftone dot area as a table image (in Step S3).

FIG. 6 shows a diagram that indicates an example of a halftone dot area that includes continuously arranged white pixels. The halftone dot area 111 shown in FIG. 6 includes white pixels 112 continuously arranged with a predetermined length or more in the primary scanning direction and the secondary scanning direction. In the case shown in FIG. 6, the halftone dot area 111 is detected as a table image. This table image expresses a table by putting a gap between cells.

Further, if (a) the objective halftone dot area has no adjacent halftone dot areas (i.e. plural halftone dot areas are not arrayed) or plural halftone dot areas are arrayed but do not include character images at at least two positions and (b) white pixels are not continuously arranged with a predetermined length or more in the primary scanning direction or the secondary scanning direction in the objective halftone dot area, then the table image detecting unit 22 does not identify the objective halftone dot area as a table image (in Step S7). Consequently, the objective halftone dot area falls into a background image.

In the aforementioned manner, after each halftone dot area falls into a table image or a background image, the compression processing unit 23 identifies other parts than the detected table image and the character images as a background image, and independently compresses the detected table image, the character images and the background image in a predetermined coding method (in Step S8).

Subsequently, the file generating unit 24 generates an image file (here a PDF file) that includes the compressed table image, the compressed character images and the compressed background image in respective layers (in Step S9).

In the aforementioned embodiment, if the halftone dot areas include no ruled lines, then the table image detecting unit 22 detects the extracted halftone dot areas as a table image if plural halftone dot areas among the extracted halftone dot areas are arrayed in a primary scanning direction and/or a secondary scanning direction and the arrayed plural halftone dot areas include the character images at at least two positions. Further, if the halftone dot areas include no ruled lines, then the table image detecting unit 22 detects the extracted halftone dot area as a table image if white pixels are continuously arranged with a predetermined length or more in a primary scanning direction and/or a secondary scanning direction in the extracted halftone dot area.

Consequently, a halftone dot area without any ruled lines in an image is correctly identified as a table image.

Such halftone dot area in an image falls into a table image at higher probability and therefore the PDF file is generated with a higher compression ratio.

The description has been presented for purposes of illustration and description, and is not intended to be exhaustive or limited.

For example, in the aforementioned embodiment, only if the width of white pixels continuously arranged with a straight line shape is equal to or less than the predetermined number of pixels (e.g. one pixel or two pixels) in the halftone dot area, the halftone dot area may be identified as a table image.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
   an area extracting unit configured to extract halftone dot areas and character images in an image;
   a table image detecting unit configured to detect the extracted halftone dot areas as a table image if (a) the extracted halftone dot areas include no ruled lines, (b) plural halftone dot areas among the extracted halftone dot areas are arrayed in a primary scanning direction and/or a secondary scanning direction, and (c) the arrayed plural halftone dot areas include the character images at least two positions;
   a compression processing unit configured to identify other parts than the detected table image and the character images as a background image, and independently compress the detected table image, the character images and the background image in a predetermined coding method; and
   a file generating unit configured to generate a file that includes the compressed table image, the compressed character images and the compressed background image in respective layers.

2. The image processing apparatus according to claim 1, wherein the compression processing unit is further configured to convert colors of each cell, each column or each row in the table image to a single color and compress the table image that has the changed color.

3. An image processing apparatus, comprising:
   an area extracting unit configured to extract a halftone dot area and a character image in an image;
   a table image detecting unit configured to detect the extracted halftone dot area as a table image if (a) the extracted halftone dot area includes no ruled lines and (b) white pixels are continuously arranged with a predetermined length or more in a primary scanning direction and/or a secondary scanning direction in the extracted halftone dot area
   a compression processing unit configured to identify other parts than the detected table image and the character image as a background image, and independently compress the detected table image, the character image and the background image in a predetermined coding method; and
   a file generating unit configured to generate a file that includes the compressed table image, the compressed character image and the compressed background image in respective layers.

4. The image processing apparatus according to claim 3, wherein the compression processing unit is further configured to convert colors of each cell, each column or each row in the table image to a single color and compress the table image that has the changed color.

5. The image processing apparatus according to claim 3, wherein the predetermined length is a maximum size of the character image that can be extracted by the area extracting unit.

* * * * *